(12) United States Patent
Maekubo et al.

(10) Patent No.: US 8,534,588 B2
(45) Date of Patent: Sep. 17, 2013

(54) WEBBING TAKE-UP DEVICE

(75) Inventors: Yoshiaki Maekubo, Aichi-ken (JP); Masaru Ukita, Aichi-ken (JP); Wataru Yanagawa, Aichi-ken (JP)

(73) Assignee: Kabushiki Kaisha Tokai-Rika-Denski-Seisakusho, Aichi-ken (JP)

( * ) Notice: Subject to any disclaimer, the term of this patent is extended or adjusted under 35 U.S.C. 154(b) by 265 days.

(21) Appl. No.: 13/184,676

(22) Filed: Jul. 18, 2011

(65) Prior Publication Data
US 2012/0025001 A1 Feb. 2, 2012

(30) Foreign Application Priority Data
Jul. 27, 2010 (JP) .................. 2010-168565

(51) Int. Cl.
*B65H 75/48* (2006.01)
(52) U.S. Cl.
USPC ....................... 242/379; 242/379.1
(58) Field of Classification Search
USPC ............... 242/379, 379.1; 280/805; 297/470
See application file for complete search history.

(56) References Cited

U.S. PATENT DOCUMENTS

| 7,686,243 B2* | 3/2010 | Jabusch et al. ............ 242/379.1 |
| 8,220,735 B2* | 7/2012 | Wang et al. .................... 242/374 |
| 2007/0075173 A1* | 4/2007 | Boelstler et al. ............. 242/379 |
| 2008/0061180 A1* | 3/2008 | Webber et al. ............. 242/379.1 |

FOREIGN PATENT DOCUMENTS
JP 2009-113551 A 5/2009

* cited by examiner

*Primary Examiner* — Sang Kim
(74) *Attorney, Agent, or Firm* — Roberts Mlotkowski Safran & Cole, P.C.

(57) ABSTRACT

There is provided a webbing take-up device including: a seating portion formed to a cylinder shaped body and facing towards a cylinder shaped body axial direction second side; a bar shaped body housed at the inside of the cylinder shaped body and comprising a protrusion portion protruding out from the bar shaped body towards the cylinder shaped body axial direction second side; a push nut attached by fitting over the protrusion portion; and a washer through which the protrusion portion is inserted, the washer being seated against the seating portion with a face of the washer on the side of the washer away from the seating portion in contact with the push nut, and the rigidity to bending of the washer set higher than the rigidity to bending of the push nut.

4 Claims, 7 Drawing Sheets

WEBBING TAKE-UP DEVICE

CROSS-REFERENCE TO RELATED APPLICATION

This application claims priority under 35 USC 119 from Japanese Patent Application No. 2010-168565 filed on Jul. 27, 2010, the disclosure of which is incorporated by reference herein.

BACKGROUND

1. Technical Field

The present invention relates to a webbing take-up device.

2. Related Art

As a webbing take-up device there are, for example, devices in which two energy absorbing members, a main shaft and a sub shaft, are disposed as torsion shafts in a straight line inside a spool (see, for example, Japanese Patent Application Laid-Open (JP-A) No. 2009-113551).

However, when the main shaft and the sub shaft are retained inside the spool at an axial direction intermediate portion, for example, in a structure assembled with a fixing component for use in retention inserted from a direction orthogonal to the axis of the torsion shaft, the axial direction length of the torsion shaft becomes longer, making the device bigger.

SUMMARY

The present invention is made in consideration of the above circumstances and is directed towards the provision of a webbing take-up device capable of suppressing such an increase in device size.

A webbing take-up device according to a first aspect of the present invention includes: a seating portion formed to a cylinder shaped body and facing towards a cylinder shaped body axial direction second side; a bar shaped body housed at the inside of the cylinder shaped body and including a protrusion portion protruding out from the bar shaped body towards the cylinder shaped body axial direction second side; a push nut attached by fitting over the protrusion portion; and a washer through which the protrusion portion is inserted, the washer being seated against the seating portion with a face of the washer on the side of the washer away from the seating portion in contact with the push nut, and the rigidity to bending of the washer set higher than the rigidity to bending of the push nut.

According to the webbing take-up device of the first aspect of the present invention, the seating portion is formed to the cylinder shaped body and faces towards the cylinder shaped body axial direction second side, and the bar shaped body is housed at the inside of the cylinder shaped body and includes the protrusion portion protruding out from the bar shaped body towards the cylinder shaped body axial direction second side. The push nut is attached by fitting over the protrusion portion, and the washer, through which the protrusion portion is inserted, is seated against the seating portion with the face of the washer on the side of the washer away from the seating portion in contact with the push nut, and the rigidity to bending of the washer set higher than the rigidity to bending of the push nut. Suppression of the rigidity of the push nut is thereby enabled, and suppression of rigidity of the push nut achieves good assembly characteristics by suppressing the load input requirement when fitting the push nut over the protrusion portion. Since the protrusion portion is supported against the seating portion by the push nut and the washer a more compact structure for retaining the bar shaped body is achieved.

A webbing take-up device according to a second aspect of the present invention includes: a spool formed in a tubular shape on which a webbing belt is wound in layers; a seating portion that is formed at an axial direction intermediate portion of a through hole formed passing through an axial center portion of the spool and faces towards a spool axial direction second side; a first torsion shaft housed in the through hole of the spool, disposed along the axial direction of the spool and including a main body portion disposed further to a spool axial direction first side than the seating portion and a protrusion portion that protrudes out from the main body portion towards the spool axial direction second side; a second torsion shaft housed in the through hole of the spool further to the spool axial direction second side than the seating portion, the second torsion shaft disposed along the spool axial direction so as to be in a straight line next to the first torsion shaft and retained at an axial direction intermediate portion of the spool; a push nut disposed further to the spool axial direction first side than the second torsion shaft and attached by fitting over the protrusion portion; and a washer through which the protrusion portion is inserted, the washer being seated against the seating portion with a face of the washer on the side of the washer away from the seating portion in contact with the push nut, and the rigidity to bending of the washer set higher than the rigidity to bending of the push nut.

According to the webbing take-up device of the second aspect of the present invention, the seating portion is formed at the axial direction intermediate portion of the through hole formed passing through the axial center portion of the spool and faces towards the spool axial direction second side. The first torsion shaft is housed in the through hole of the spool, disposed along the axial direction of the spool and includes the main body portion disposed further to the spool axial direction first side than the seating portion and the protrusion portion that protrudes out from the main body portion towards the spool axial direction second side. The second torsion shaft is housed in the through hole of the spool further to the spool axial direction second side than the seating portion, disposed along the spool axial direction so as to be in a straight line next to the first torsion shaft and retained at the axial direction intermediate portion of the spool.

The push nut and the washer are disposed further to the spool axial direction first side than the second torsion shaft. The push nut is attached by fitting over the protrusion portion of the first torsion shaft. The washer, through which the protrusion portion of the first torsion shaft is inserted, is seated against the seating portion with the face of the washer on the side of the washer away from the seating portion in contact with the push nut, and the rigidity to bending of the washer set higher than the rigidity to bending of the push nut. Accordingly, even though a load acts on the first torsion shaft in a direction pulling towards the spool axial direction first side, this load is supported by the seating portion of the spool through the washer, suppressing the first torsion shaft from falling out. Due to the rigidity to bending of the washer being greater than that of the push nut, even though bending load from the first torsion shaft side is input to the push nut, bending deformation of the push nut is prevented or effectively suppressed by the support from the washer. The axial direction length of the first torsion shaft is suppressed by retaining the protrusion portion of the first torsion shaft using the push nut and the washer.

A webbing take-up device of a third aspect of the present invention is the webbing take-up device of the second aspect, wherein: a first groove is formed in the through hole of the spool extending along the spool axial direction at a location further to the spool axial direction first side than the seating portion; a second groove is formed in the through hole of the spool extending along the spool axial direction further to the spool axial direction second side than the first groove, partially out of alignment with the first groove in rotation about the spool axis and connected to the first groove; and the seating portion is formed by a terminal end wall portion towards the spool axial direction second side at a terminal end portion facing of the end of the second groove adjacent to the first groove, a projection tab is formed to an external peripheral portion of the washer, the projection tab being insertable in the second groove and supported by the terminal end wall portion.

According to the webbing take-up device of the third aspect of the present invention, the first groove is formed in the through hole of the spool extending along the spool axial direction at a location further to the spool axial direction first side than the seating portion. The second groove is formed extending along the spool axial direction further to the spool axial direction second side than the first groove, partially out of alignment with the first groove in rotation about the spool axis and connected to the first groove. The seating portion is formed by the terminal end wall portion facing towards the spool axial direction second side at the terminal end portion of the end of the second groove adjacent to the first groove, and the projection tab is formed to the external peripheral portion of the washer insertable in the second groove and supported by the terminal end wall portion. The washer can be supported by the seating portion by supporting the projection tab of the webbing with the terminal end wall portion formed by the first groove and the second groove being partly out of alignment with each other in rotation about the spool axis, even while suppressing the internal diameter of the through hole at the spool axial direction second side location.

A webbing take-up device of a fourth aspect of the present invention is the webbing take-up device configured as the second or the third aspect, wherein a recess is formed at an end portion of the second torsion shaft on the side facing towards the first torsion shaft and the protrusion portion intrudes into the recess.

According to the webbing take-up device of the fourth aspect of the present invention, the recess is formed at the end portion of the second torsion shaft on the side facing towards the first torsion shaft and the protrusion portion of the first torsion shaft intrudes into the recess. The axial direction length of the second torsion shaft is accordingly suppressed in comparison to configurations not formed with the recess.

As explained above, according to the webbing take-up device of the first aspect of the present invention an excellent effect is exhibited of enabling suppression of the device from becoming bigger.

According to the webbing take-up device of the second aspect of the present invention an excellent effect is exhibited of enabling suppression of the device from becoming bigger even while there are two torsion shafts disposed in a straight line inside the spool.

According to the webbing take-up device of the third aspect of the present invention an excellent effect is exhibited of enabling suppression of the device from becoming bigger by suppressing the internal diameter of the through hole at the spool axial direction second side location while also suppressing the axial direction length of the first torsion shaft.

According to the webbing take-up device of the fourth aspect of the present invention an excellent effect is exhibited of enabling suppression of the device from becoming bigger by suppressing the axial direction length of the two torsion shafts.

BRIEF DESCRIPTION OF THE DRAWINGS

Exemplary embodiments of the present invention will be described in detail based on the following figures, wherein.

DETAILED DESCRIPTION

First Exemplary Embodiment

Figure 1:
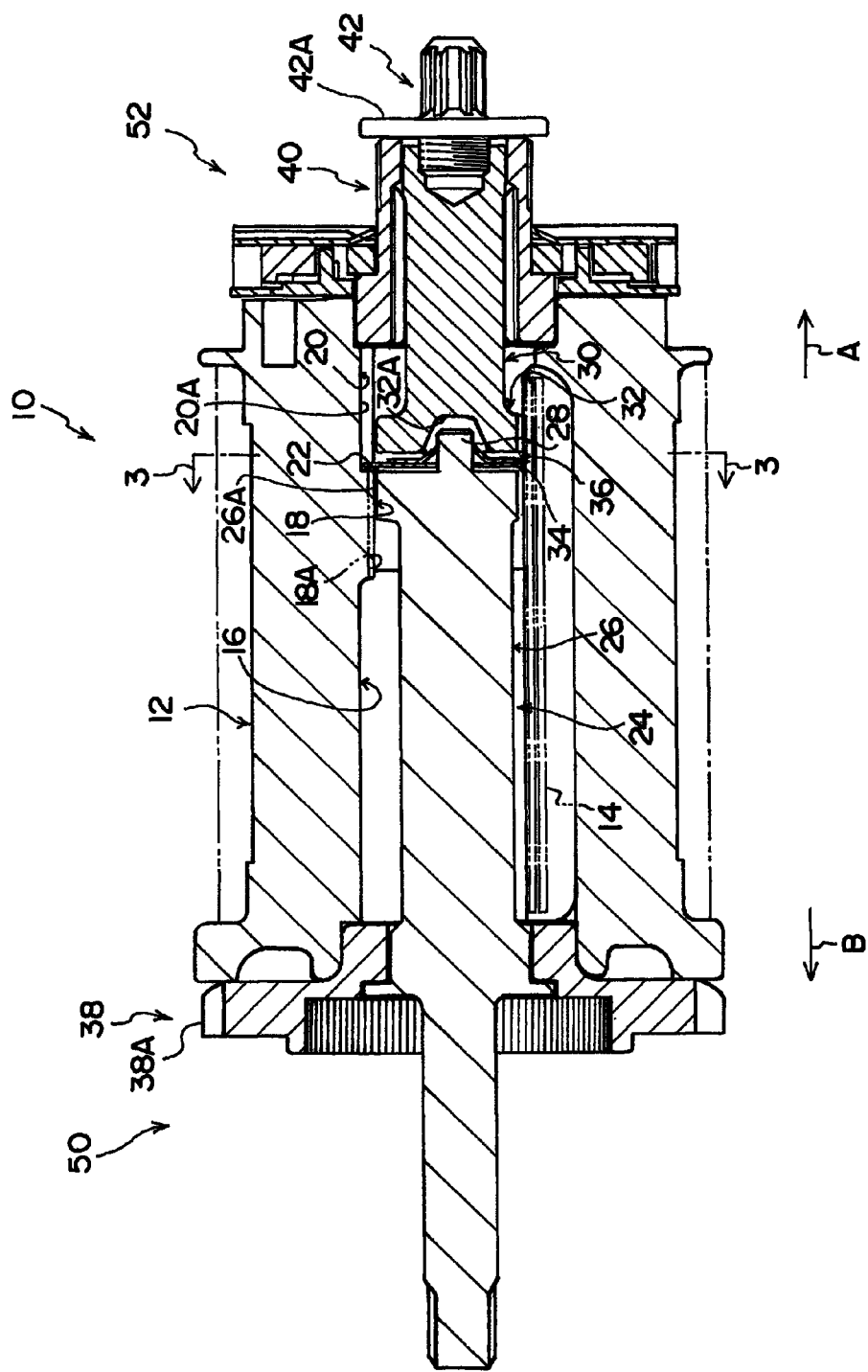
FIG. 1 is a cross-section illustrating a webbing take-up device according to a first exemplary embodiment of the present invention.
Figure 2:
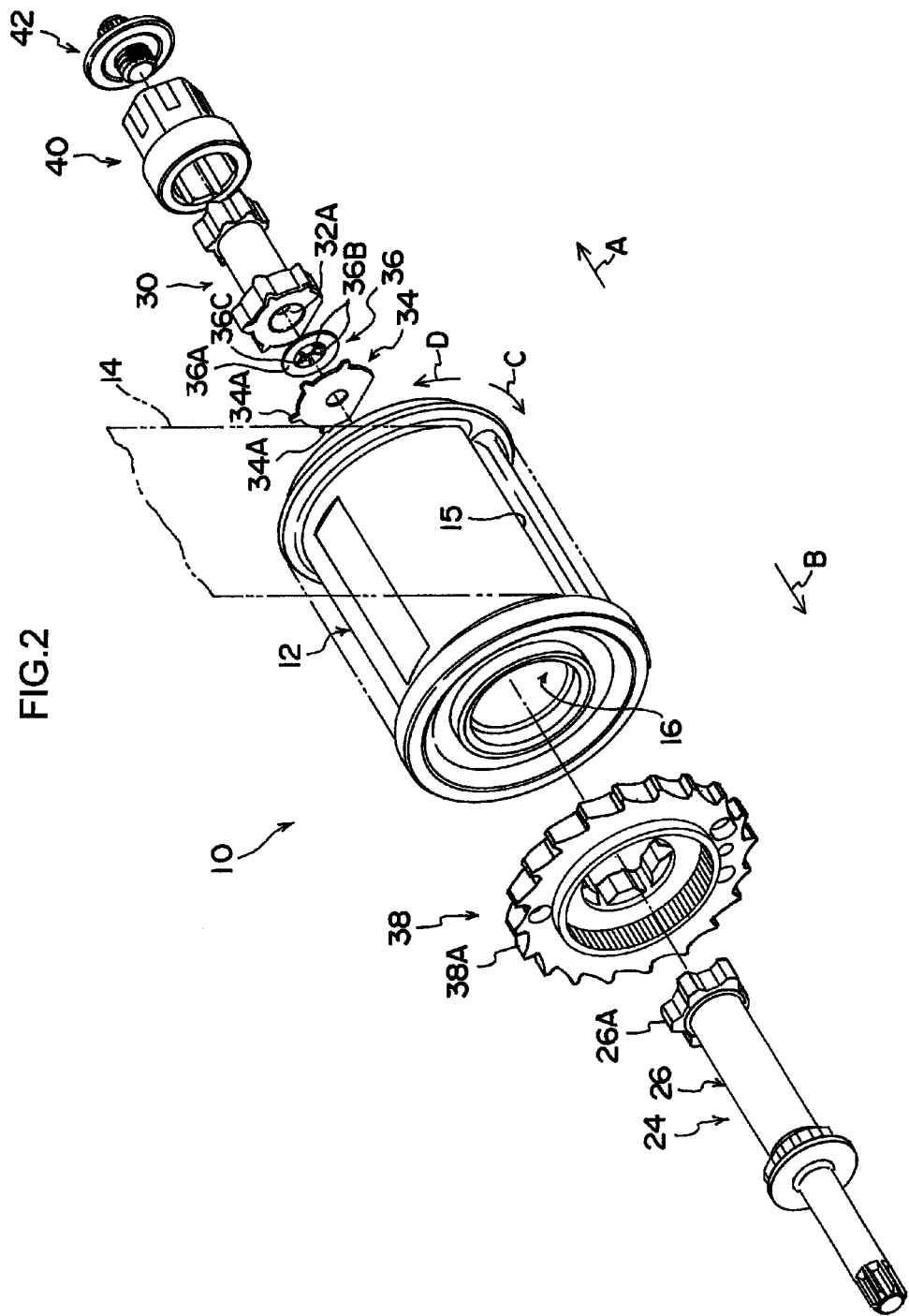
FIG. 2 is a perspective view of relevant portions of a webbing take-up device according to the first exemplary embodiment of the present invention.

FIG. 1 is a cross-section of a webbing take-up device 10 according to a first exemplary embodiment of the present invention. FIG. 2 is an exploded perspective view of relevant portions (a shaft assembly) of the webbing take-up device 10. The arrow A direction in the drawings indicates an axial direction second side of a spool 12 serving as a cylinder shaped body in the webbing take-up device 10, and the arrow B direction indicates an axial direction first side of the spool 12.

As shown in FIG. 1 and FIG. 2, the webbing take-up device 10 according to the first exemplary embodiment is provided with a spool 12 configuring a take-up shaft. The spool 12 is cast in a substantially circular cylindrical shape and is rotatably supported at portions at the two axial direction ends by a frame (not shown in the drawings) fixed to a vehicle.

Figure 3:
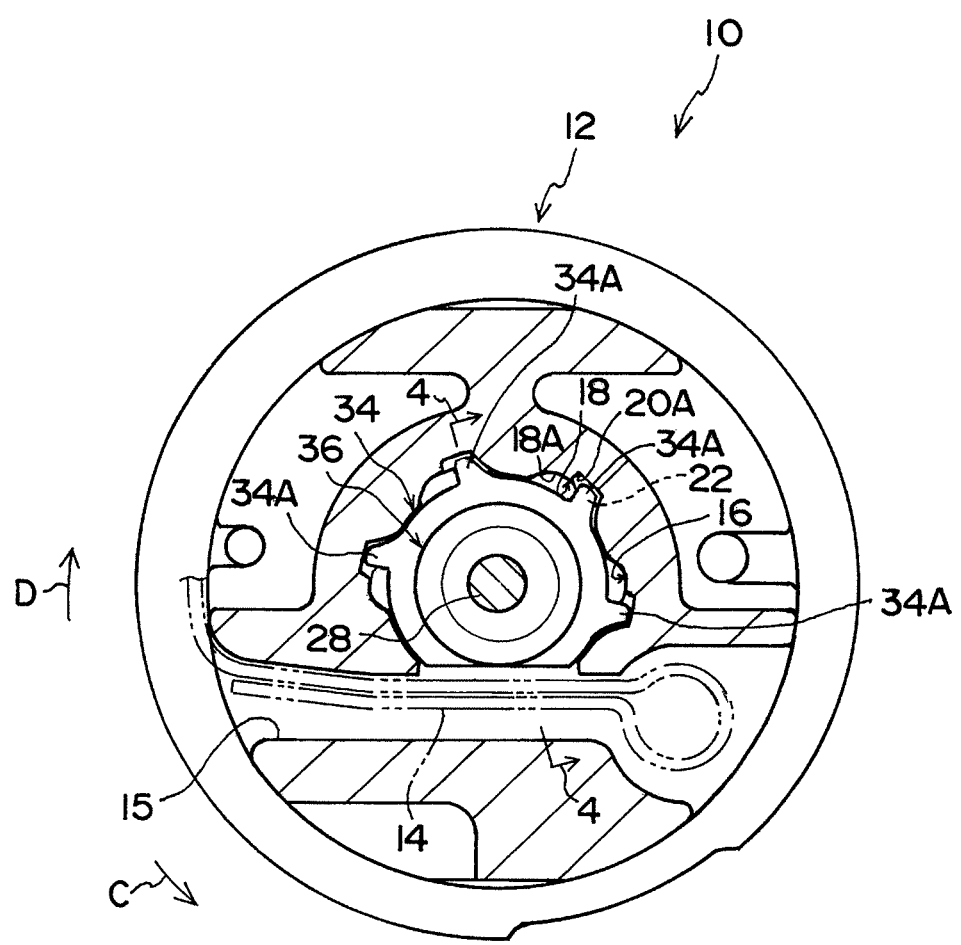
FIG. 3 is an expanded cross-section taken along line 3-3 in FIG. 1.

As shown in FIG. 2, a webbing insertion slot 15 is formed opening in a long rectangular shape along the axial direction in the spool 12. As shown in FIG. 3, an enlarged cross-section taken along line 3-3 in FIG. 1, the webbing insertion slot 15 is formed so as to pass through the spool 12 along a chord on the external peripheral side of the axial center of the spool 12. As shown in FIG. 2, a long strip-shaped webbing belt 14 is inserted through the webbing insertion slot 15 in a state such that a portion at the proximal end of the webbing belt 14 is stopped from pulling out from the webbing insertion slot 15. The webbing belt 14 is wound in layers from its proximal end onto the spool 12. The webbing belt 14 is taken up onto the spool 12 by rotating the spool 12 in a take-up direction (the arrow C direction in FIG. 2). The spool 12 is rotated in a pullout direction (the arrow D direction in FIG. 2) by pulling the webbing belt 14 out from the spool 12.

A through hole 16 is formed in the spool 12 as an assembly hole so as to pass through the axial center of the spool 12. As shown in FIG. 1, seating portions 22 are formed at an axial direction intermediate portion of the through hole 16 so as to face towards the spool 12 axial direction second side (the right hand side in FIG. 1).

A first mounting hole section 18 is provided in the through hole 16 of the spool 12 at a location further towards the spool 12 axial direction first side (towards the left hand side in FIG. 1) than the seating portions 22. As shown in FIG. 5, an enlarged cross-section taken on line 3-3 of FIG. 1 to illustrate only the spool 12, plural individual first grooves 18A (four in the present exemplary embodiment) are formed with substantially trapezoidal cross-sections at the outer peripheral side of the first mounting hole section 18. The first grooves 18A extend along the spool 12 axial direction (see FIG. 1), and are disposed alongside each other at even intervals around the circumferential direction of the spool 12. The first groove 18A formed at the front side in the cross-section shown in FIG. 1 is depicted with double-dashed intermittent lines (the same applies to FIG. 4).

As shown in FIG. 1, a second mounting hole section 20 is formed in the through hole 16 of the spool 12 further towards the spool 12 axial direction second side (the right hand side in FIG. 1) than the first mounting hole section 18 (the first grooves 18A). As shown in FIG. 5, plural individual second grooves 20A (four grooves in the present exemplary embodiment) are formed at the outer peripheral side of the second mounting hole section 20. The second grooves 20A extend along the spool 12 axial direction (see FIG. 1) and are partly out of alignment in rotation about the spool axis with the first grooves 18A and connected to the first grooves 18A. The plural individual second grooves 20A are disposed at even intervals around the spool 12 circumferential direction.

The seating portions 22 illustrated in FIG. 1 are formed in the spool 12 as terminal end wall portions that face towards the spool 12 axial direction second side (the right hand side in FIG. 1) at the end portion on the side of the second grooves 20A adjacent to the first grooves 18A. In the cross-section shown in FIG. 1, the seating portions 22 are disposed at the boundary region between the first mounting hole section 18 and the second mounting hole section 20. In the present exemplary embodiment, as shown in FIG. 5, the diameter at the troughs of the second grooves 20A is set greater than the diameter at the troughs of the first grooves 18A in order to set a larger surface area for the seating portions 22.

As shown in FIG. 1, a main torsion shaft 24 and a sub torsion shaft 30, serving as a first torsion shaft and a bar shaped body, respectively, configuring a force limiter mechanism are housed in (inside) the through hole 16 of the spool 12. The main torsion shaft 24 and the sub torsion shaft 30 are disposed next to each other in a straight line along the spool 12 axial direction and fall within the broad definition of "energy absorbing members". While most of the main torsion shaft 24 is housed in the through hole 16 of the spool 12 further to the spool 12 axial direction first side (the left hand side in FIG. 1) than the seating portions 22, the sub torsion shaft 30 is housed therein further to the spool 12 axial direction second side (the right hand side in FIG. 1) than the seating portions 22.

The length of the main torsion shaft 24 is set longer than the axial direction length of the sub torsion shaft 30. A substantially circular pillar shaped main body portion 26 of the main torsion shaft 24 is disposed further to the spool 12 axial direction first side than the seating portions 22. A retained portion 26A is formed at the spool 12 axial direction second side of the main body portion 26. The retained portion 26A is formed in cross-section orthogonal to the axial direction with a similar shape to the inside peripheral shape of the first mounting hole section 18, but with a slightly smaller profile to the inside peripheral shape of the first mounting hole section 18 (see FIG. 2). A short circular pillar shaped protrusion portion 28 protrudes out from the main body portion 26 towards the spool 12 axial direction second side.

Figure 4:
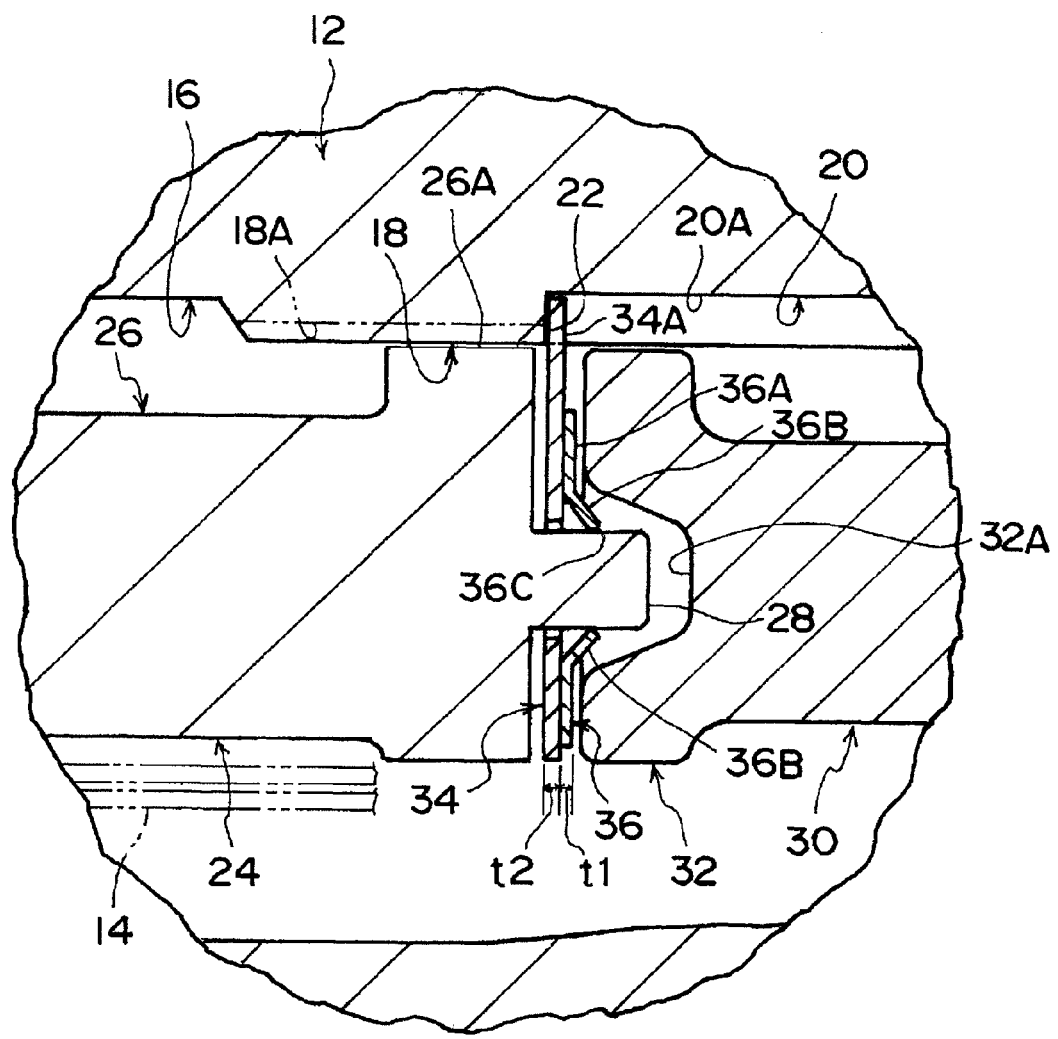
FIG. 4 is an expanded cross-section taken along line 4-4 in FIG. 3.
Figure 5:
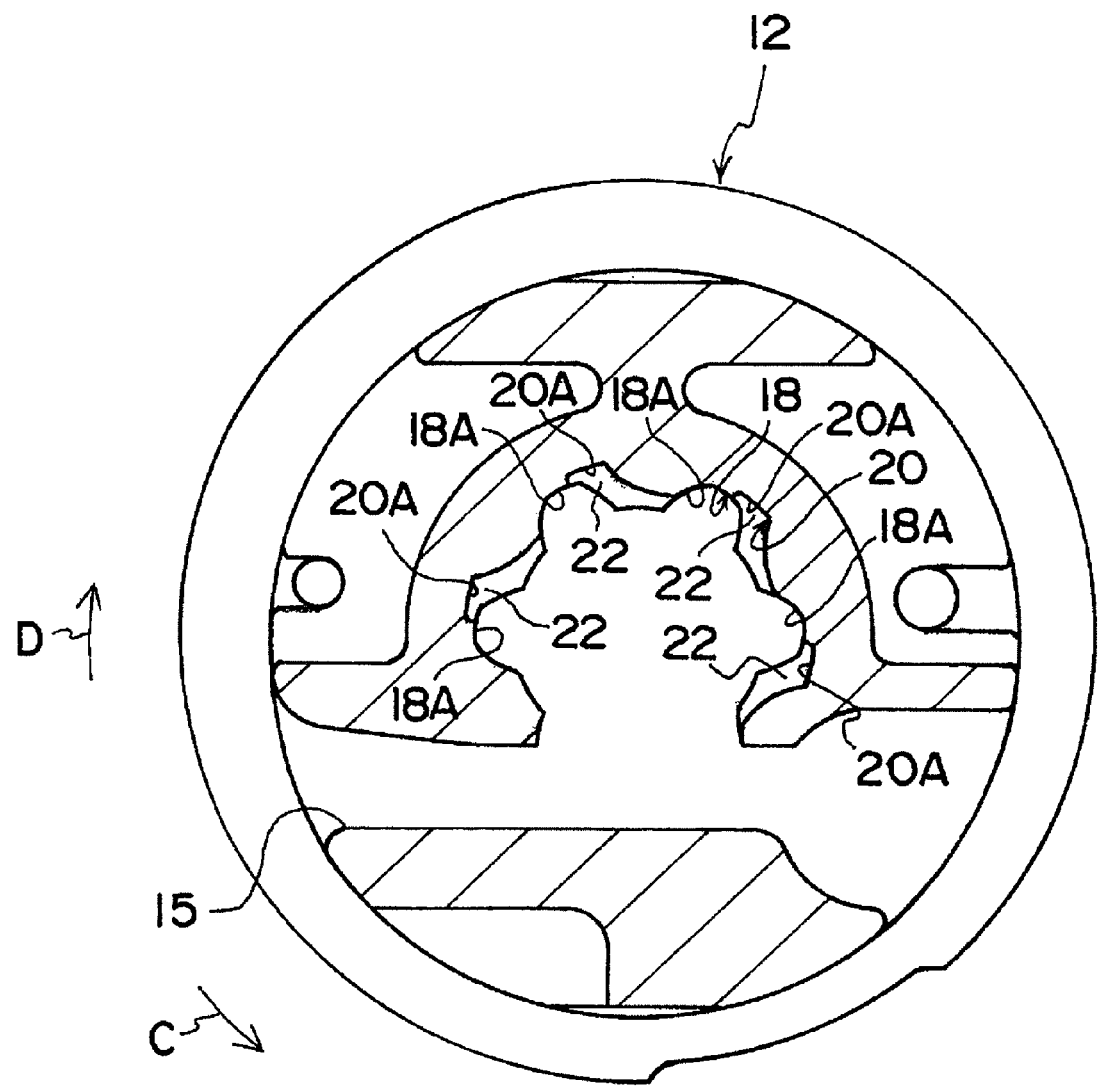
FIG. 5 illustrates only the spool in an expanded cross-section taken along line 3-3 in FIG. 1.

As shown in FIG. 4, a push nut 36 (an element within the broad definition of a "fastener") is disposed to the spool 12 axial direction first side of the sub torsion shaft 30. The push nut 36 is formed, for example, by pressing out from a resilient metal plate. As shown in FIG. 2 and FIG. 4, the push nut 36 has a push hole 36C formed through the center of a ring portion 36A, with plural engagement claws 36B formed around a peripheral region of the push hole 36C. The engagement claws 36B are disposed in a radiating shape when view face on with the free ends of the engagement claws 36B facing towards the center of the push hole 36C. The engagement claws 36B project out at a specific angle away from a washer 34.

As shown in FIG. 4, the push nut 36 is attached by fitting the protrusion portion 28 of the main torsion shaft 24 inside. Namely, the protrusion portion 28 of the main torsion shaft 24 is pushed into the push hole 36C of the push nut 36 such that the engagement claws 36B are in an engaged state with the protrusion portion 28 by pressing against the resilient force of the engagement claws 36B.

The washer 34 is disposed sandwiched between the push nut 36 and the seating portions 22. Namely the washer 34 is seated on the seating portions 22 and the face of the washer 34 on the side away from the seating portions 22 makes contact with the push nut 36. The washer 34 is a high rigidity metal plate-shaped washer set with a higher rigidity to bending than that of the push nut 36. In the present exemplary embodiment, the relationship between the plate thickness t1 of the push nut 36 and the plate thickness t2 of the washer 34 is t1<t2. The protrusion portion 28 of the main torsion shaft 24 is inserted into the washer 34.

As shown in FIG. 3, projection tabs 34A are formed to an external peripheral portion of the washer 34 so as to be insertable in the second grooves 20A and be supported by the seating portions 22 (the terminal end wall portions). A straight-line cut-out is formed to a portion on the outer peripheral side of the washer 34 (a bottom portion in FIG. 2) in order to secure a passing portion at an axial direction intermediate portion in the spool 12 for insertion of the webbing belt 14. The washer 34 is accordingly not symmetrically shaped about its center when viewed in profile along the axial direction.

As shown in FIG. 1, a lock gear 38 configuring a first lock mechanism 50 is attached to an axial direction intermediate portion of the main torsion shaft 24 on the spool 12 axial direction first side (the left hand side in FIG. 1). The portion of the main torsion shaft 24 for mounting the lock gear 38 is provided with crimp-on ribs to suppress play in the radial direction, with the lock gear 38 rendered incapable of rotation with respect to the main torsion shaft 24. Ratchet teeth 38A are formed to an external peripheral portion of the lock gear 38. A lock plate (not shown in the drawings) configuring the first lock mechanism 50 is provided to a frame (not shown in the drawings) so as to correspond to the ratchet teeth 38A. The lock plate is capable of moving relative to the ratchet teeth 38A so as to make contact with or move away from the ratchet teeth 38A. In an actuated state of the first lock mechanism 50, initiated when a rapid vehicle deceleration state arises or there is abrupt rotation of the spool 12 in the pullout direction, the lock plate is configured so as to mesh with the ratchet teeth 38A and restrict rotation of the ratchet teeth 38A in the pullout direction.

As shown in FIG. 4, a retained portion 32 is provided as an end portion disposed on the main torsion shaft 24 side of the sub torsion shaft 30. Engagement projections are formed at the outer peripheral side of the retained portion 32 of the sub torsion shaft 30 to engage with the inside of the spool 12. The sub torsion shaft 30 is thereby retained at an axial direction intermediate portion of the spool 12. An end portion (end face) on at the end of the retained portion 32 of the sub torsion shaft 30 facing the main torsion shaft 24 is formed with a recess 32A into which the protrusion portion 28 of the main torsion shaft 24 intrudes. In other words configuration is made such that the retained portion 32 end of the sub torsion shaft 30 and a portion of the protrusion portion 28 of the main torsion shaft 24 overlap with each other in the axial direction.

While detailed explanation is omitted, a sleeve 40 is disposed so as to fit inside the spool 12 at the outer peripheral side of the leading end portion of the sub torsion shaft 30 (the end portion of the sub torsion shaft 30 away from the retained portion 32), as shown in FIG. 1. The sleeve 40 also makes contact with a flange section 42A of a screw 42 fastened into the leading end portion of the sub torsion shaft 30.

A second lock mechanism 52 is provided at the spool 12 axial direction second side in the webbing take-up device 10. A simple explanation regarding the second lock mechanism 52 is that plural clutch components configuring the second lock mechanism 52 are disposed at side of the spool 12 and on the outer peripheral side of the sleeve 40. Namely a rotation body that rotates as a single unit with the sleeve 40 is fitted over the sleeve 40, and a mechanism is provided that restricts rotation of the rotation body in the pullout direction by directly or indirectly engaging with the rotation body. In the present exemplary embodiment the configuration is made such that the second lock mechanism 52 is capable of operating coupled to the first lock mechanism 50. Configuration is made, for example, such that a body frame detection section is provided to the webbing take-up device 10 for detecting information about the body frame of an occupant seated on a seat, such as their weight. The second lock mechanism 52 in then switched between an operable state and a non-operable state according to detection results of the body frame detection section.

Operation and Effect

Explanation follows regarding operation and effect of the exemplary embodiment described above.

Explanation follows first regarding the operation and effect of the webbing take-up device 10 as shown in FIG. 1 from a functional perspective.

In the webbing take-up device 10, when an acceleration sensor of the first lock mechanism 50 detects a rapid vehicle deceleration state, or when the spool 12 is abruptly rotated in the pullout direction by the body of an occupant abruptly pulling on the webbing belt 14 fitted over the body as the body of the occupant attempts to relatively move rapidly towards the vehicle front under inertia during rapid deceleration, first the lock plate (not shown in the drawings) meshes with the ratchet teeth 38A of the lock gear 38 in the first lock mechanism 50. A first lock state is thereby adopted in which rotation of the lock gear 38 in the pullout direction is restricted. By restricting rotation of the lock gear 38 in the pullout direction rotation of the main torsion shaft 24 in the pullout direction is also restricted.

The main torsion shaft 24 and the spool 12 are prevented from rotating relative to each other due to there being only an extremely small gap present between the similar non-circular shaped profiles of the external peripheral profile of the retained portion 26A of the main torsion shaft 24 and the inner peripheral profile of the first mounting hole section 18 of the through hole 16. Consequently, by restricting rotation of the main torsion shaft 24 in the pullout direction as described above, the rotation of the spool 12 in the pullout direction is also restricted. The main torsion shaft 24 undertakes twisting deformation when a rotational force is imparted to the spool 12 in this state of a magnitude that exceeds the rigidity to twisting of the main torsion shaft 24, resulting in corresponding rotation of the spool 12 being permitted and energy being absorbed.

In the present exemplary embodiment, the push nut 36 and the washer 34 are disposed on the spool 12 axial direction first side of the sub torsion shaft 30. The push nut 36 is attached with the protrusion portion 28 of the main torsion shaft 24 fitted inside. The washer 34 is seated on the seating portions 22 with the face of the washer 34 on the side away from the seating portions 22 in contact with the push nut 36. The rigidity to bending of the washer 34 is set higher than that of the push nut 36, and the protrusion portion 28 of the main torsion shaft 24 is inserted into the washer 34. Accordingly, even though a load acts on the main torsion shaft 24 in a direction pulling towards the spool 12 axial direction first side, this load is supported by the seating portions 22 of the spool 12 through the washer 34, suppressing the main torsion shaft 24 from falling out (thrust direction fixing). Due to the rigidity to bending of the washer 34 being greater than that of the push nut 36, even though bending load from the main torsion shaft 24 side is input to the push nut 36, bending deformation of the push nut 36 is prevented or effectively suppressed by the support from the washer 34.

Accordingly, the axial direction length of the main torsion shaft 24 is suppressed by retaining the protrusion portion 28 of the main torsion shaft 24 with the push nut 36 and the washer 34. Enabling a simple shape to be adopted for the fixing section of the main torsion shaft 24 of the spool 12, a shape not requiring complicated processing to be performed, also enables a reduction in cost to be achieved.

If, for example, the washer 34 is made to slightly warp when the protrusion portion 28 of the main torsion shaft 24 is fitted into the push nut 36 by pressing the washer 34 through the push nut 36 with a jig, then the restoring force of the washer 34 acts on the main torsion shaft 24 in a pulling direction (namely a force towards the spool 12 axial direction second side (the arrow A direction). The lock gear 38 attached to the main torsion shaft 24 is accordingly pressed against the spool 12 side, suppressing movement between the lock gear 38 and the spool 12 and suppressing unwanted noise generation.

Provision of the washer 34 having a higher rigidity to bending than the push nut 36 enables the rigidity of the push nut 36 itself to be suppressed. In turn, suppression of rigidity of the push nut 36 achieves good assembly characteristics by suppressing the load input requirement when fitting the push nut 36 over the protrusion portion 28 of the main torsion shaft 24.

When the second lock mechanism 52 is actuated with the first lock mechanism 50 is in an actuated state, a second lock state is achieved. The second lock state restricts rotation of the sub torsion shaft 30 in the pullout direction and restricts rotation of the spool 12 in the pullout direction. In this state the main torsion shaft 24 and the sub torsion shaft 30 both deform by twisting when a rotation force exceeding the sum of the twisting rigidities of both the main torsion shaft 24 and the sub torsion shaft 30 is imparted to the spool 12 in the pullout direction. Corresponding rotation of the spool 12 is thereby permitted and energy is absorbed.

The second lock mechanism 52 is configured coupled to the first lock mechanism 50. Further, for example, the second lock mechanism 52 can be configured switched between an operable state and an non-operable state according to detection results of a body frame detector section provided to the webbing take-up device 10 to detect body frame data such as the body weight of an occupant seated in a seat. Rotation of the spool 12 is permitted when the second lock mechanism 52 in the operable state by imparting a rotation force in the pullout direction of a greater magnitude to the sum of the rigidity to twisting of both the main torsion shaft 24 and the sub torsion shaft 30. However, rotation of the spool 12 is permitted when the second lock mechanism 52 in the non-operational state by imparting a rotation force in the pullout direction of a greater magnitude to the rigidity to twisting of the main torsion shaft 24. Namely, the amount of the energy capable of absorption can be varied.

In the present exemplary embodiment, the recess 32A for the protrusion portion 28 of the sub torsion shaft 30 intrude into is formed in an end portion of the sub torsion shaft 30 facing the main torsion shaft 24. The axial direction length of the sub torsion shaft 30 is accordingly suppressed in comparison to configurations not formed with the recess 32A.

A brief explanation follows next regarding an assembly method of the webbing take-up device 10 (an assembly method of the main torsion shaft 24 and the sub torsion shaft 30).

In order to assemble the main torsion shaft 24, the main torsion shaft 24 is inserted from the spool 12 axial direction first side into the through hole 16, and the retained portion 26A of the main torsion shaft 24 is inserted into the first mounting hole section 18 of the through hole 16, stopping rotation of the main torsion shaft 24. The washer 34 and the push nut 36 are inserted into the through hole 16 from the spool 12 axial direction second side, and assembly is achieved in which the main torsion shaft 24 is prevented from falling out by inserting the protrusion portion 28 of the main torsion shaft 24 into the washer 34 and the push nut 36 (fitting into the push nut 36). The sub torsion shaft 30 is then inserted into the through hole 16 from the spool 12 axial direction second side and assembled to the spool 12. During assembly the main torsion shaft 24, the washer 34, the push nut 36 and the sub torsion shaft 30 are accordingly inserted into the through hole 16 of the spool 12 from their respective directions, and assemble operation is facilitated because there directions are each along the spool 12 axial direction.

In the present exemplary embodiment, the first grooves 18A are formed in the through hole 16 of the spool 12 so as to extend along the axial direction of the spool 12 at locations further to the spool 12 axial direction first side than the seating portions 22. The second grooves 20A are formed extending along the spool 12 axial direction further to the spool 12 axial direction second side than the first grooves 18A, partly out of alignment in rotation about the spool axis to the first grooves 18A and connected to the first grooves 18A. The seating portions 22 are formed at terminal end portions in the second grooves 20A extension direction as terminal end wall portions facing towards the spool 12 axial direction second side. As shown in FIG. 3, the projection tabs 34A are formed to an external peripheral portion of the washer 34 so as to be insertable in the second grooves 20A and be supported by the seating portions 22 (the terminal end wall portions). The washer 34 can be supported by the seating portions 22 by supporting the projection tabs 34A of the washer 34 with the seating portions 22 formed by the first grooves 18A and the second grooves 20A being partly out of alignment with each other in rotation about the spool axis, even while suppressing the internal diameter of the through hole 16 at the spool 12 axial direction second side location. Good assembly operation characteristics are achieved since the washer 34 can be seated on the seating portions 22 by simply sliding the projection tabs 34A of the washer 34 along the second grooves 20A.

As explained above, in the present exemplary embodiment, the total length of the webbing take-up device 10 is suppressed even though there are two torsion shafts (the main torsion shaft 24 and the sub torsion shaft 30) disposed in a straight line inside the spool 12 shown in FIG. 1, enabling the device to be suppressed from becoming bigger.

Second Exemplary Embodiment

Figure 6:
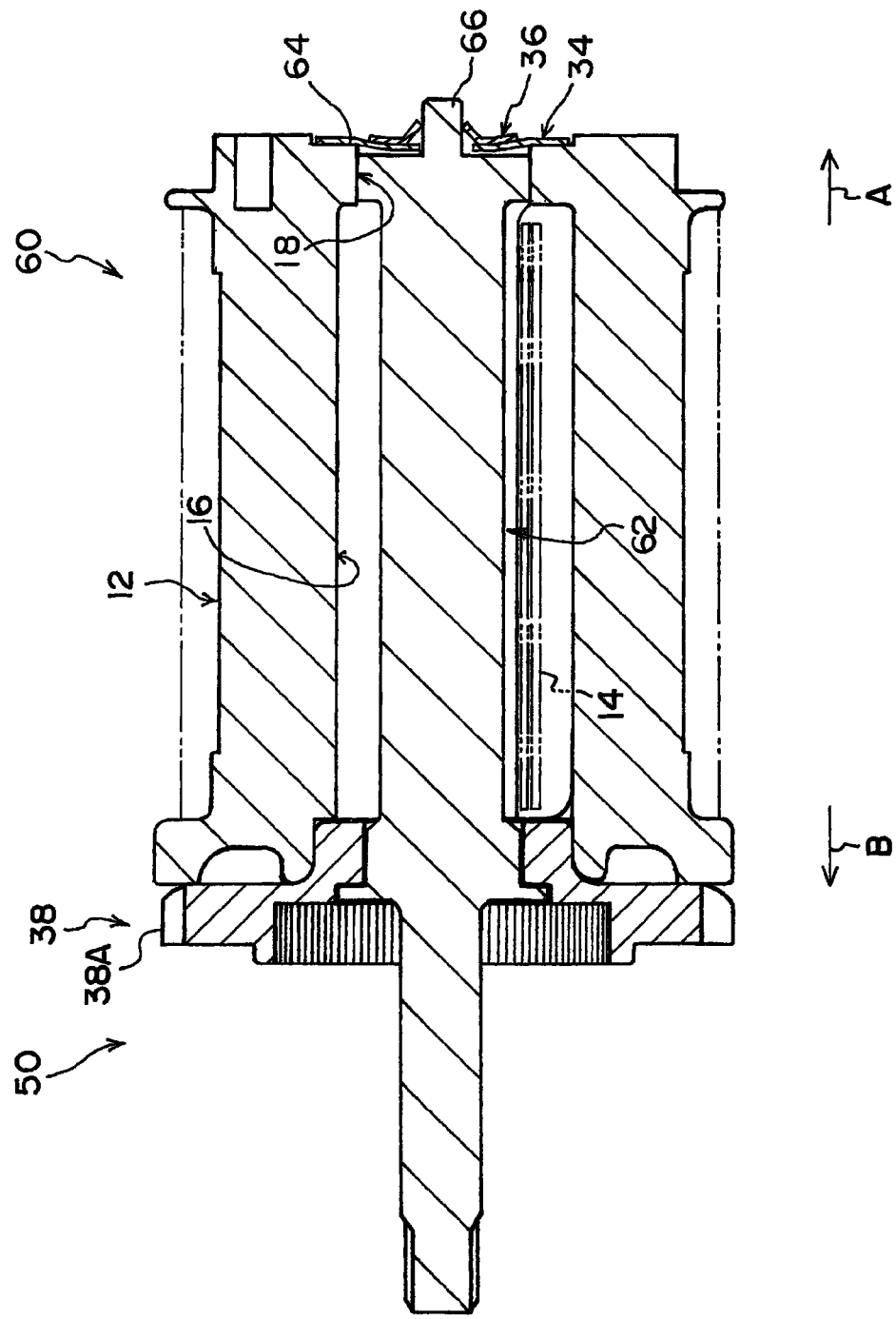
FIG. 6 is a cross-section illustrating a webbing take-up device according to a second exemplary embodiment of the present invention.
Figure 7A:
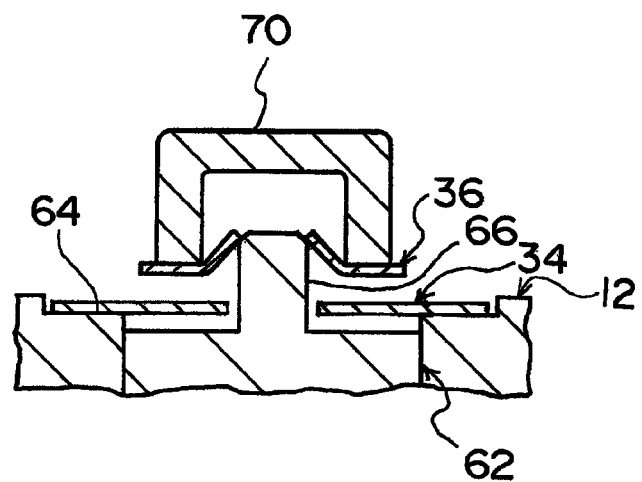
FIG. 7A is a cross-section illustrating a state when a push nut is fitted over a protrusion portion with a jig, and illustrates a state in which an attempt is being made to insert the push nut over the protrusion portion with the jig.
Figure 7B:
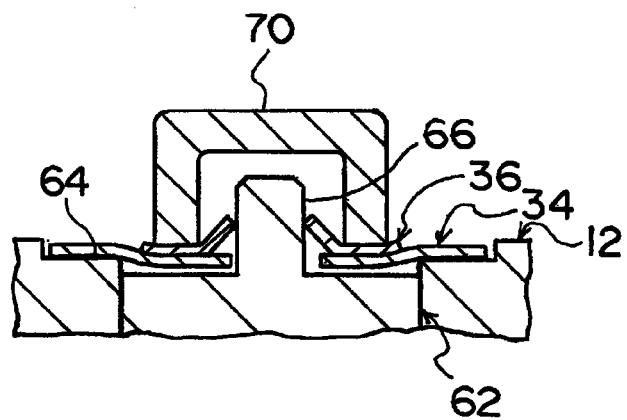
FIG. 7B is a cross-section illustrating a state when a push nut is fitted over a protrusion portion with a jig, and illustrates a state in which a washer is being pressed by the jig through a push nut.

Explanation follows regarding a webbing take-up device 60 according to a second exemplary embodiment of the present invention, with reference to FIG. 6 and FIG. 7A and FIG. 7B. FIG. 6 illustrates a cross-section of the webbing take-up device 60 according to the second exemplary embodiment of the present invention. FIG. 7A and FIG. 7B are cross-sections showing states when fitting the push nut 36. As shown in FIG. 6, the webbing take-up device 60 differs from the webbing take-up device 10 of the first exemplary embodiment (see FIG. 1) in not being disposed with a sub torsion shaft 30 (see FIG. 1) and in the position where a torsion shaft 62, serving as a bar shaped body, is retained in the spool 12. Other parts of the configuration are substantially the same as those of the first exemplary embodiment. Parts of the configuration essentially the same as those of the first exemplary embodiment are hence allocated the same reference numerals and further explanation is omitted.

As shown in FIG. 6, a seating portion 64 is configured in the through hole 16 of the spool 12 at an end portion on the spool 12 axial direction second side (the right hand side in FIG. 6), with the seating portion 64 facing towards the spool 12 axial direction second side. A torsion shaft 62 (an element in the broad definition of an "energy absorbing member") configuring a force limiter mechanism is housed in (inside) the through hole 16 of the spool 12 so as to be disposed along the spool 12 axial direction. A short cylinder shaped protrusion portion 66 protrudes out from an end portion of the torsion shaft 62 on the spool 12 axial direction second side (the right hand side in FIG. 6) towards the spool 12 axial direction second side.

The push nut 36 is disposed at an end portion on the spool 12 axial direction second side (the right hand side in FIG. 6). The push nut 36 is attached by inserting the protrusion portion 66 of the torsion shaft 62 into the push nut 36. A washer 34 is disposed so as to be sandwiched between the push nut 36 and a seating portion 64. Namely the washer 34 is seated against the seating portion 64 with the face of the washer 34 on the side away from the seating portion 64 in contact with the push nut 36.

Operation and Effect

Explanation follows regarding assembly of the torsion shaft 62 and operation and effect in the second exemplary embodiment.

As shown in FIG. 7A, during assembling the torsion shaft 62 the push nut 36 is fitted over the protrusion portion 66 of the torsion shaft 62. During assembly, as shown in FIG. 7B, the washer 34 is pressed by a jig 70 through the push nut 36, so as to slightly warp the washer 34. The torsion shaft 62 is assembled in this state at the spool 12 axial direction second side.

When the torsion shaft 62 has been assembled at the spool 12 axial direction second side, pulling force due to the restoring force of the washer 34 (namely a force towards the spool 12 side (in the arrow A direction)) acts on the torsion shaft 62 as shown in FIG. 6. The lock gear 38 attached to the torsion shaft 62 is accordingly pressed against the side of the spool 12, thereby suppressing movement between the lock gear 38 and the spool 12 and suppressing unwanted noise generation.

By provision of the washer 34 having a higher rigidity to bending than that of the push nut 36 the rigidity of the push nut 36 itself is suppressed. Suppressing the rigidity of the push nut 36 achieves good assembly characteristics by suppressing the load required when fitting the push nut 36 over the protrusion portion 66 of the torsion shaft 62, as shown in FIG. 7A.

According to the webbing take-up device 60 of the second exemplary embodiment as explained above (see FIG. 6), due to making the structure for retaining the torsion shaft 62 at the spool 12 axial direction second side more compact the device can be suppressed from becoming bigger.

In the above first exemplary embodiment, a preferable configuration from the perspective of suppressing the internal diameter of the through hole 16 in locations at the spool 12 axial direction second side is with: the seating portions 22 shown in drawings such as FIG. 4 configured by terminal end wall portions at the terminal end portion of the second grooves 20A adjacent to the first grooves 18A facing towards the spool 12 axial direction second side; and with the projection tabs 34A formed to the external peripheral portion of the washer 34 insertable into the second grooves 20A and supported by the seating portions 22 (the terminal end wall portions). However, configuration may be made, for example, with the seating portion formed by forming a through hole in the spool with a step portion formed by setting the hole diameter at an axial direction second side larger than the hole diameter at an axial direction first side, such that a ring portion of a washer is supported by such a seating portion (the step portion).

In the first exemplary embodiment a preferable configuration, from the perspective of suppressing the axial direction length of the sub torsion shaft 30, is with the recess 32A for the protrusion portion 28 of the sub torsion shaft 30 to intrude into formed at the end portion of the sub torsion shaft 30 facing the main torsion shaft 24. However, configuration may be made without a recess 32A formed to the second torsion shaft (the sub torsion shaft 30).

In the above first exemplary embodiment, the first torsion shaft is configured by the main torsion shaft 24 and the second torsion shaft is configured by the sub torsion shaft 30, however the first torsion shaft may be configured as a main torsion shaft and the second torsion shaft configured as a sub torsion shaft.

In the above exemplary embodiments the cylinder shaped body is configured by the spool 12, and the bar shaped body is configured by the main torsion shaft 24 or the torsion shaft 62. However, configuration may be made with the cylinder shaped body configured by another component configuring a portion of the webbing take-up device other than the spool 12. The bar shaped body may also be configured by another component configuring a portion of the webbing take-up device housed on the inside of the cylinder shaped body other than a torsion shaft (the main torsion shaft 24 or the torsion shaft 62).

What is claimed is:

1. A webbing take-up device comprising:
a spool formed in a tubular shape on which a webbing belt is wound in layers;
a seating portion that is formed at an axial direction intermediate portion of a through hole formed passing through an axial center portion of the spool and faces towards a spool axial direction second side;
a first torsion shaft housed in the through hole of the spool, disposed along the axial direction of the spool and comprising a main body portion disposed further to a spool axial direction first side than the seating portion and a protrusion portion that protrudes out from the main body portion towards the spool axial direction second side;
a second torsion shaft housed in the through hole of the spool further to the spool axial direction second side than the seating portion, the second torsion shaft disposed along the spool axial direction so as to be in a straight line next to the first torsion shaft and retained at an axial direction intermediate portion of the spool;
a push nut disposed further to the spool axial direction first side than the second torsion shaft and attached by fitting over the protrusion portion; and
a washer through which the protrusion portion is inserted, the washer being seated against the seating portion with a face of the washer on the side of the washer away from the seating portion in contact with the push nut, and the rigidity to bending of the washer set higher than the rigidity to bending of the push nut.

2. The webbing take-up device of claim 1, wherein:
a first groove is formed in the through hole of the spool extending along the spool axial direction at a location further to the spool axial direction first side than the seating portion;
a second groove is formed in the through hole of the spool extending along the spool axial direction further to the spool axial direction second side than the first groove, partially out of alignment with the first groove in rotation about the spool axis and connected to the first groove; and
the seating portion is formed by a terminal end wall portion facing towards the spool axial direction second side at a terminal end portion of the end of the second groove adjacent to the first groove, and a projection tab is formed to an external peripheral portion of the washer, the projection tab being insertable in the second groove and supported by the terminal end wall portion.

3. The webbing take-up device of claim 2, wherein a recess is formed at an end portion of the second torsion shaft on the side facing towards the first torsion shaft and the protrusion portion intrudes into the recess.

4. The webbing take-up device of claim 1, wherein a recess is formed at an end portion of the second torsion shaft on the side facing towards the first torsion shaft and the protrusion portion intrudes into the recess.

* * * * *